July 19, 1932.  R. W. STROUT  1,868,181
MACHINE ELEMENT
Filed Sept. 30, 1930
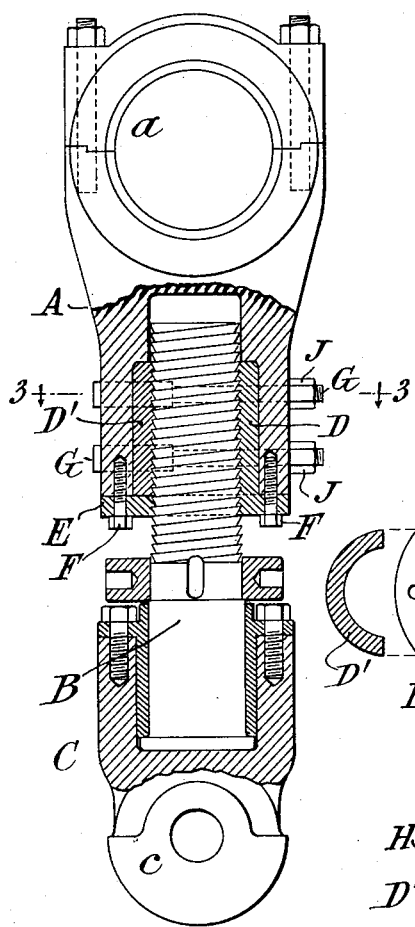
Fig.1.
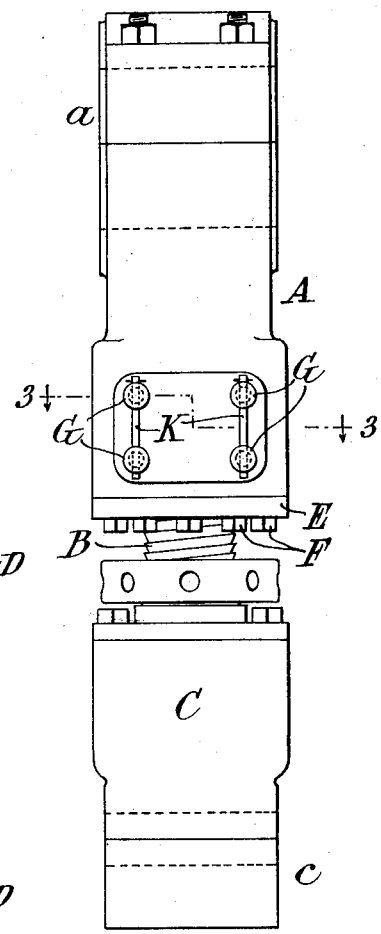
Fig.2.
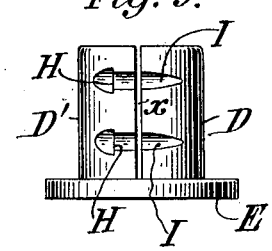
Fig.4.
Fig.5.
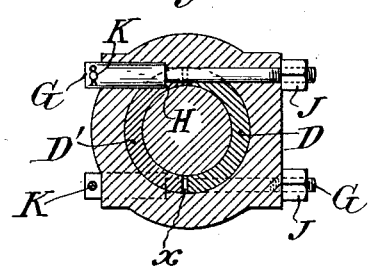
Fig.3
INVENTOR
Robert W. Strout,
By Attorneys,
Fraser, Myers & Manley Patented July 19, 1932

1,868,181

UNITED STATES PATENT OFFICE

ROBERT W. STROUT, OF BROOKLYN, NEW YORK, ASSIGNOR TO E. W. BLISS COMPANY, OF BROOKLYN, NEW YORK, A CORPORATION OF DELAWARE

MACHINE ELEMENT

Application filed September 30, 1930. Serial No. 485,340.

This invention relates to telescopic screw connections such as are used for adjusting the length of a thrust-piece, such as a pitman or connecting rod or other such element in machines. In ordinary power presses, for example, the pitman connecting the crank on the power shaft with the sliding head or platen is usually made adjustable in length by making it in two sections or members, one of which enters into the other, the latter or tubular member being partially split and provided with screws or bolts for drawing its split parts together to embrace the inner member. The inner member is screw-threaded and screws into internal threads in the tubular member; so that after making this screw adjustment by turning the inner member the parts are made fast by thus clamping the outer member against the inner.

The present invention provides a substitute construction which has certain important practical advantages, as will be explained hereinafter.

The accompanying drawing shows the preferred form of the construction as applied to a pitman or connecting rod for a power press or any similar or analogous apparatus.

Fig. 1 is an elevation partly in longitudinal mid section.

Fig. 2 is a side elevation viewed at right angles to Fig. 1.

Fig. 3 is a cross section on the line 3—3 in Figs. 1 and 2.

Fig. 4 is a horizontal section of the inner threaded bushing of which Fig. 5 is a side elevation.

Referring to the drawing, the thrust-piece, as a pitman or other device requiring lengthwise adjustment comprises two thrust members A and B, the former being an external tubular member and the latter entering into the tubular member and being adjustable therein, for which purpose it is preferably provided with a screw-thread as shown. The member A is shown as formed with a bearing eye $a$ for engaging a crank in case the invention is used with a pitman. The member B may connect with any part to be driven from the crank through the members A, B. It is shown as swiveled in a member C having a bearing eye $c$ for engaging the slide of a press. The tubular member A, instead of being split at its lower portion so that its halves may be drawn together by transverse screws or bolts, is constructed integrally or solidly; and is counterbored to receive within it a split bushing D, which is shown separately in Fig. 5, and in cross-section in Fig. 4. The bushing D is internally threaded to fit the threads on the member B, and its end abuts the end of the counterbore which thus exerts its downward thrust against both parts of the bushing, and through the bushing to the screw. The part D of the bushing is separable; when the two parts are concentrically united there is between them a gap $x$, Fig. 5. The bushing is held within the counterbore or socket in the tubular member by any suitable fastening, the means shown being a flange E formed integrally with the bushing D and abutting against the end of the member A, to which it is attached by tap bolts F. The threaded interior of the bushing D is made as a free-working fit with the threaded portion of the member B so that the latter may be readily screwed into the bushing to give the precise longitudinal adjustment desired. When this is attained the loose half D' of the bushing has to be drawn toward the other half of the bushing so as to grip the respective screw threads tightly together. In this closing together of the halves of the bushing the gap $x$ will be more or less taken up but should not be entirely closed. In other words, the gap should be wide enough to enable the two halves of the bushing to be forced together into tight gripping engagement with the inner member without their resisting this by bearing against each other.

For thus forcing together the halves of the bushing any suitable clamping means may be applied. The simplest means is by screws or bolts G, G which pass through holes in the member A so that they may serve also the function of anchoring the bushing within the socket of this member. These screws have long heads which enter deeply into counterbores in the member A, the bottoms or inner shoulders of these heads engaging shoulders H, H formed on the movable half D' of the bushing. For compactness, it is desirable that the bolts G, G be located as close together as possible, as shown in Fig. 3, being separated just sufficiently to permit the free end of the member B to freely enter between them. This necessitates that the parts of the bushing be formed with grooves I, I, which are entered and practically filled by the shanks of the screw bolts. Thus the bolts have also the function of holding the two parts of the bushing against rotation in the socket. The bolts are threaded in any convenient place for engagement either with the metal of the member A or with nuts J applied on the ends of the bolts, the latter construction being generally preferable. To keep the bolts from turning while these nuts are being screwed on or off, it is desirable to anchor them by rods K passing through holes in the projecting ends of the bolt heads, as shown in Fig. 3, this being a convenient construction, the rods K being held in place by cotter pins or otherwise in any convenient manner.

When the bolts G are tightened they draw the loose piece or half D' of the bushing against the screw and force the latter into tight contact with the threads in the opposite part of the bushing, thus effectively gripping the screw threads with a parallel grip for the entire length of the bushing.

The construction provided by this invention has the advantages over the construction heretofore used, that it avoids the weakness incident to the splitting of the tubular member to enable its halves to be drawn together; the stress produced by tightening the clamping bolts is all expended in squeezing the nut or threaded washer against the screw and the tightening means is relieved of the necessity of deforming the heavy split construction of the tubular member; and in the event that there should be any stripping of the internal screw threads this is confined to the bushing D' which may be readily replaced, being a comparatively small, light, inexpensive part, whereas in the former construction the entire tubular member, having integral threads, had to be replaced.

A defect of the old construction is that if the operator fails to lock the clamping screws, and the machine is operated, the binding forces tend to widen the split in the outer member and are liable to split it through or to break off one of the split portions; whereas, with the new construction failure to tighten the screws can only spread the two halves of the bushing to the extent of their original slight clearance, and no destructive strains are applied to the member A which is solid or unsplit.

This invention is to be distinguished from constructions wherein a screw is engaged by a divided nut the halves of which may be separated in order to rapidly move the screw endwise through the nut, but which when forced together engage the screw threads so that the screw may be turned to adjust it up or down within the nut. The present invention requires that the internally threaded members shall be clamped fast upon the screw so that the entire structure shall be in effect integral after each adjustment.

The invention is susceptible of such modification as lies within the skill or judgment of a constructor or engineer, whereby it may be applied in various locations and put to various uses in machine construction.

I claim as my invention:

1. An adjustable machine element comprising a thrust-piece of adjustable length composed of a tubular member and a threaded member entering it, characterized in that the tubular member is undivided and is provided with a flanged divided threaded bushing socketed within it, into which bushing the treaded member is screwed, the flange of said bushing fastened to the end of the tubular member, and clamping means for tightening the parts of the divided bushing upon the threaded member.

2. An adjustable machine element comprising a thrust-piece of adjustable length composed of a tubular member and a threaded member entering it, characterized in that the tubular member is undivided and has fastened within it a two-part bushing having threads engaging those of the threaded member, one part fixed within the tubular member, and the other movable to clamp or release the threads, the movable part having shoulders, and transverse screws the heads of which engage said shoulders.

3. An adjustable machine element comprising a thrust-piece of adjustable length composed of a tubular member and a threaded member entering it, characterized in that the tubular member is undivided and has a counterbore forming a socket, with a two-part bushing in said socket, both parts of the bushing abutting against the upper end of the socket, the bushing having threads engaging those of the threaded member, and clamping means for tightening the parts of the bushing upon the threaded member to hold the latter against rotation.

4. A machine element comprising a thrust-piece of adjustable length including two members, the one a tubular member and the other a threaded member entering it, characterized in that the tubular member is undivided and is provided with a divided threaded bushing, socketed within it into which bushing the threaded member is screwed, the aggregate circumferential dimension of the interior surfaces of the bushing divisions being less than the circumference of the threaded member, whereby the divided bushing is adapted on compression to bind the threaded member; in combination with means passing through the tubular member and the bushing on each side of the threaded member for contracting the bushing and for securing the bushing non-rotatably in the tubular member.

5. A machine element comprising a thrust-piece of adjustable length including two members, the one a tubular member and the other a cylindrical, exteriorly threaded member entering the tubular member, characterized in that the tubular member is undivided and is provided with a two-part, internally threaded bushing socketed within it into which bushing the threaded member is screwed, each part of the bushing being less than half-cylindrical whereby the bushing is adapted on compression to bind the cylindrical, exteriorly threaded member engaged therewith, in combination with means passing through the tubular member and the bushing on each side of the threaded member for contracting the bushing and for securing the bushing non-rotatably in the tubular member.

6. A machine element comprising a thrust-piece of adjustable length including two members, the one a tubular member and the other a cylindrical, exteriorly threaded member entering the tubular member, characterized in that the tubular member is undivided and is provided with a two-part, internally threaded bushing socketed within it into which bushing the threaded member is screwed, each part of the bushing being less than half-cylindrical whereby the bushing is adapted on compression to bind the cylindrical, exteriorly threaded member engaged therewith, and means for drawing said bushing parts into clamping relation with said cylindrical member in such manner that the tubular member is not subjected to any expansion action.

In witness whereof I have hereunto signed my name.

ROBERT W. STROUT.